(12) United States Patent
Maruo et al.

(10) Patent No.: US 7,786,189 B2
(45) Date of Patent: Aug. 31, 2010

(54) OLIGOMER-MODIFIED LAYERED INORGANIC COMPOUNDS AND THEIR USE IN NANOCOMPOSITES

(75) Inventors: Kazunobu Maruo, Kanagawa (JP); Tomomichi Kanda, Chiba (JP); Scott Omachinski, Mount Prospect, IL (US); Ying Liang, Lake Zurich, IL (US); Tie Lan, Lake Zurich, IL (US)

(73) Assignees: Amcol International Corp., Hoffman Estates, IL (US); Mitsubishi Gas Chemical Company, Inc., Tokyo (JP)

( * ) Notice: Subject to any disclaimer, the term of this patent is extended or adjusted under 35 U.S.C. 154(b) by 1070 days.

(21) Appl. No.: 10/743,115

(22) Filed: Dec. 22, 2003

(65) Prior Publication Data
US 2005/0137288 A1 Jun. 23, 2005

(51) Int. Cl.
C08K 9/00 (2006.01)
C08K 3/34 (2006.01)
C08L 77/00 (2006.01)

(52) U.S. Cl. .................. 523/216; 252/378 R; 524/445; 524/606

(58) Field of Classification Search ............. 252/378 R; 524/445; 523/216
See application file for complete search history.

(56) References Cited

U.S. PATENT DOCUMENTS

| | | | |
|---|---|---|---|
| 4,398,642 A | 8/1983 | Okudaira et al. | |
| 4,433,136 A | 2/1984 | Miyamoto et al. | |
| 4,438,257 A | 3/1984 | Miyamoto et al. | |
| 4,535,901 A | 8/1985 | Okudaira et al. | |
| 4,894,411 A * | 1/1990 | Okada et al. ................ | 524/710 |
| 5,004,561 A | 4/1991 | Nomura et al. | |
| 5,011,873 A | 4/1991 | Nomura et al. | |
| 5,853,886 A | 12/1998 | Pinnavaia et al. | |
| 5,877,248 A | 3/1999 | Beall et al. | |
| 6,017,632 A | 1/2000 | Pinnavaia et al. | |
| 6,057,035 A | 5/2000 | Singh et al. | |
| 6,096,803 A | 8/2000 | Pinnavaia et al. | |
| 6,228,903 B1 | 5/2001 | Beall et al. | |
| 6,232,388 B1 | 5/2001 | Lan et al. | |
| 6,384,121 B1 * | 5/2002 | Barbee et al. ................ | 524/445 |
| 2002/0165306 A1 | 11/2002 | Gilmer et al. | |

FOREIGN PATENT DOCUMENTS

| | | |
|---|---|---|
| WO | WO-00/09605 | 2/2000 |
| WO | WO-00/34377 | 6/2000 |

OTHER PUBLICATIONS

Wei Xie, et al., Thermal Degradation Chemistry of Alkyl Quaternary Ammonium Montmorillonite, Chem. Mater. 2001, 13, 2979-2990, © 2001 American Chemical Society, Published on Web Aug. 11, 2001.

* cited by examiner

*Primary Examiner*—Vickey Nerangis
(74) *Attorney, Agent, or Firm*—Marshall, Gerstein & Borun LLP

(57) ABSTRACT

Intercalates, exfoliates thereof, and nanocomposite compositions are formed by intercalating a layered silicate material, e.g., a phyllosilicate, with an oligomer or polymer intercalant that is a reaction product of at least one diamine with at least one dicarboxylic acid, to form a polyamide oligomer containing a xylylenediamine component. The oligomer or polymer may be formed in-situ by contacting the layered phyllosilicate with polymerizable monomer reactants using conditions to cause reaction and polymerization in the intercalating composition and intercalation of the resulting oligomer and/or polymer, between platelet layers of the phyllosilicate. An amine functionality of the oligomer or polymer is protonated for ion-exchange with interlayer cations of the phyllosilicate to bond the intercalant to the phyllosilicate platelet, at the protonated amine, at a negative charge site previously occupied by the interlayer cations.

35 Claims, No Drawings

US 7,786,189 B2

OLIGOMER-MODIFIED LAYERED INORGANIC COMPOUNDS AND THEIR USE IN NANOCOMPOSITES

FIELD OF THE INVENTION

The present invention is directed to intercalated layered silicate materials, and exfoliates thereof, manufactured by sorption and bonding of one or more monomeric, oligomeric or polymeric intercalant surface modifier compounds onto inner platelet surfaces of a layered silicate material, and nanocomposite compositions containing the intercalates and exfoliates thereof. The intercalant surface modifier compounds are intercalated between planar layers of a swellable layered material, such as a phyllosilicate, to expand the interlayer spacing of adjacent layers at least about 5 Angstroms (Å), preferably at least about 8 Å. More particularly, the present invention is directed to intercalates, exfoliates and nanocomposite compositions formed with an intercalant compound selected from monomeric, oligomeric or polymeric intercalant molecules that include at least one protonated amine group, preferably a terminal amine group forming a portion of a m-xylylenediamine reactant.

The surface modifier intercalant molecules are protonated at the amine group for ion-exchange with cations on the internal platelet surfaces of the layered silicate material, such as a phyllosilicate, preferably a smectite clay. The protonated amine functionalities on the intercalant molecules are bonded on the inner surface of the phyllosilicate platelets and bonded to the platelet surfaces at the negative charge sites of the platelet surfaces to form columns of the intercalant molecules that extend upwardly, away from the platelet surfaces to provide surprisingly large basal spacing(s) between adjacent phyllosilicate platelets with relatively few intercalant molecules.

The intercalated oligomers form a unique type of intercalate and exfoliate that provides unexpected thermal stability to the intercalates, exfoliates, and the nanocomposite compositions in which they are dispersed.

The resulting intercalates are neither entirely organophilic nor entirely hydrophilic, but a combination of the two; have surprising sorption of hydrophilic and hydrophobic molecules; having surprising compatibility, and reactivity, with combined matrix materials, such as polymers; and easily can be exfoliated and combined as individual platelets with a matrix polymer and capable of being processed at relative high temperatures without thermal degradation, to provide unexpected thermal stability to the nanocomposites.

The resulting intercalate or exfoliate; or polymer/intercalate or polymer/exfoliated platelet composite materials (nanocomposite compositions) are useful for food wrap having improved gas impermeability; for electrical components; for food grade drink containers; for raising the viscosity of polar organic liquids; flame retardation; and for altering one or more physical properties of a matrix polymer, such as elasticity and temperature characteristics, e.g., glass transition temperature and, in particular, the intercalates and exfoliates are surprisingly thermally stable in themselves, and also provide substantially increased temperature resistance and thermal stability to matrix polymers in which they are dispersed to prevent polymer degradation.

BACKGROUND AND PRIOR ART

Polyamide oligomers and polymers have been intercalated into layered silicate materials in a variety of ways, as evidenced by U.S. Pat. Nos. 6,232,388 B1 ('388); 6,228,903 B1 ('903); and 5,877,248 ('248). The most common way to intercalate a polyamide oligomer or polymer into a layered silicate material is disclosed in the '388 patent wherein the layered silicate material is first treated with a surface modifying onium ion to expand the platelet spacing by ion-exchange with interlayer cations of the layered silicate material, followed by intercalation of the polyamide oligomer or polymer. Another method of intercalating a polyamide oligomer or polymer into a layered silicate material is disclosed in the '903 patent wherein an organic solvent is intercalated into the layered silicate material in an intercalating composition comprising the layered silicate, water, and the organic solvent and the intercalating composition is sheared to form a gel to bond the organic solvent to a surface of the layered silicate platelets. Thereafter the gel is dehydrated to a water content of 10% or less at which point the polyamide and a solvent for the polyamide contact the layered silicate material for intercalation of the polyamide oligomer or polymer. A third method of intercalating a polyamide oligomer or polymer into a layered silicate material is disclosed in the '248 patent, wherein neither an onium ion surface modifier nor an organic solvent is used, but the polyamide oligomer or polymer is directly intercalated into a wet layered silicate material to complex the amide functionality with the interlayer cations at the negative charge sites of the layered silicate material platelet surfaces.

Claytec U.S. Pat. Nos. 6,017,632; 6,096,803; and 5,853,886 teach intercalation of amino-functional reagents, e.g., curing agents for epoxy resins, by protonating the cation exchange sites of the layered silicate material prior to intercalation of the amino-functional reagents. Triton Systems U.S. Pat. No. 6,057,035 discloses nanocomposite compositions having enhanced thermal stability and performance by intercalating surfactants/compatibility agents into the layered silicate material that are phosphonium, preferably tetra-phenyl phosphonium.

The following Mitsubishi Gas Corporation (MGC) patents, and other MGC patents describe in detail the manufacturing of xylylenediamine-containing oligomers and polymers: U.S. Pat. Nos. 4,433,136; 4,438,257; 5,004,561; and 5,011,873. U.S. Pat. Nos. 4,398,642 and 4,535,901 describe multi-layer bottles containing a polyamide gas barrier layer, wherein the polyamide can contain a xylylenediamine group.

Others have recognized that layered silicate materials intercalated with alkyl quaternary ammonium ions (onium ions) are subject to thermal degradation, see *Thermal Degradation Chemistry Of Alkyl Quaternary Ammonium Montmorillonite* 2001 American Chemical Society, Chem. Matter 2001, 13, 2979-2990. The poor thermal stability is caused by a Hoffmann elimination reaction of the alkyl ammonium in the organoclays.

This long felt need to provide intercalated layered silicate materials, having excellent thermal stability, that provide improved structural properties, gas/liquid barrier properties, and/or increased temperature resistance when dispersed in a matrix polymer to form nanocomposite compositions has been solved in accordance with the intercalates, exfoliates and nanocomposite compositions described herein in a unique manner by intercalating the layered silicate materials with a xylylene diamine-containing oligomer or polymer, without using onium ion spacing agents.

Definitions

Whenever used in this Specification, the terms set forth shall have the following meanings:

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

"Layered Material" shall mean an inorganic material, such as a silicate clay mineral, that is in the form of a plurality of adjacent, bound layers and has a thickness, for each layer, of about 3 Å to about 100 Å, preferably about 10 Å.

"Platelets" shall mean individual layers of the Layered Material.

"Intercalate" or "Intercalated" shall mean a Layered Material that includes a surface-modifier intercalant polymerized monomer, oligomer or polymer containing a protonated amine functionality disposed between adjacent platelets of the Layered Material to increase the interlayer spacing between the adjacent platelets at least about 5 Å, preferably at least about 8 Å.

"Intercalation" shall mean a process for forming an Intercalate.

"Intercalant" shall mean a monomeric, oligomeric and/or polymeric compound that is the reaction product of at least one diamine with at least one diacid containing at least one protonated amine functionality.

"Intercalating Carrier" shall mean a carrier comprising water with or without an organic solvent optionally used together with an Intercalant to form an Intercalating Composition capable of achieving Intercalation of the Layered Material.

"Intercalating Composition" or "Intercalant Composition" shall mean a composition comprising an Intercalant with or without an Intercalating Carrier for the Intercalant, and a Layered Material.

"Amine Functionality" shall mean an amine functional group derived from the diamine portion of the Intercalant that, preferably, forms a terminal moiety of the Intercalant.

"Exfoliate" or "Exfoliated" shall mean individual platelets of an Intercalated Layered Material so that adjacent platelets of the Intercalated Layered Material can be dispersed individually throughout a matrix polymer.

"Tactoid" shall mean a partially exfoliated Intercalated Layered Material containing 2 to 15 platelet layers, preferably 2 to 5 platelet layers.

"Exfoliation" shall mean a process for forming an Exfoliate from an Intercalate.

"Nanocomposite" shall mean a mixture that includes a monomer, oligomer, polymer, or copolymer having dispersed therein an intercalate, tactoids, and/or, preferably, a plurality of individual platelets obtained by exfoliating the Intercalated Layered Material.

"Monomer" shall mean a monomer that is a xylylenediamine, a dicarboxylic acid, a xylylenediamine/dicarboxylic acid reaction product or adduct, or a xylylenediamine/dicarboxylic acid/xylylenediamine reaction product or adduct.

"Oligomer" or "Intercalant Oligomer" is an oligomer compound having a formula 1 or 2, as follows, wherein "B" represents a xylylenediamine-component-containing Base, and "A" represents a dicarboxylic acid, wherein at least one of the B components includes a protonated amine functionality, preferably a terminal protonated amine functionality, and wherein n=0-20, preferably 1-10, more preferably 1-5; and m=0-20, preferably 1-10, more preferably 1-5:

$$B(AB)_n \quad\quad\quad 1$$

$$B(AB)_m A \quad\quad\quad 2$$

"Matrix Polymer" shall mean a thermoplastic or thermosetting oligomer or polymer in which the Intercalate, Tactoids, and/or Exfoliate is mixed or dispersed to form a Nanocomposite.

SUMMARY

In brief, the present invention is directed to intercalates, exfoliates thereof, and nanocomposite compositions, formed by intercalating a layered silicate material, e.g., a phyllosilicate, with an oligomer or polymer intercalant that is a reaction product of at least one diamine with at least one dicarboxylic acid. An amine functionality of the oligomer or polymer is protonated for ion-exchange with interlayer cations of the phyllosilicate to bond the intercalant to the phyllosilicate platelet, at the protonated amine, at a negative charge site previously occupied by the interlayer cations.

Accordingly, one aspect of the intercalates, exfoliates, nanocomposite compositions and methods described herein is to provide an intercalate for admixture with a matrix polymer, to form a nanocomposite composition, that is capable of exfoliating in the nanocomposite composition to retard thermal degradation of the polymer and to impart one or more of the following enhanced properties: structural strength; gas/liquid barrier in films, temperature resistance, and higher glass transition temperature.

Another aspect of the intercalates, exfoliates, nanocomposite compositions and methods described herein is to provide an intercalate that can be melt sheared with a matrix polymer at higher matrix polymer melt temperatures, without, or with less, thermal degradation so that the intercalates can be added to higher melting matrix polymers to improve strength, gas/liquid barrier properties and/or temperature resistance in a broader list of matrix polymers.

Another aspect of the intercalates, exfoliates, nanocomposite compositions and methods described herein is to provide a method of intercalating a layered silicate material, such as a smectite clay, with a polyamide oligomer wherein at least a portion, e.g., at least 50 mole %, of a diamine component making up the oligomer molecules is a xylylenediamine to provide the intercalate with better resistance to thermal degradation.

The above and other aspects and advantages of the intercalates, exfoliates, nanocomposite compositions and methods described herein will become more apparent from the following detailed description of the preferred embodiments.

Examples of diamines other than m-xylylenediamine include aliphatic diamines, such as tetramethylenediamine; pentamethylenediamine; 2-methylpentanediamine; hexamethylenediamine; heptamethylenediamine; octamethylenediamine; nonamethylenediamine; decamethylenediamine; dodecamethylenediamine; 2,2,4-trimethylhexamethylenediamine; and 2,4,4-trimethylhexamethylenediamine; examples of alicyclic diamines include 1,3-bis(aminomethyl)cyclohexane; 1,4-bis(aminomethyl)cyclohexane; 1,3-diaminocyclohexane; 1,4-diaminocyclohexane; bis(4-aminocyclohexyl)methane; 2,2-bis(4-aminocyclohexyl)propane; bis(aminomethyl)decalin; and bis(aminomethyl)tricyclodecane; and examples of suitable aromatic diamines include bis(4-aminophenol)ether; p-phenylenediamine; p-xylylenediamine; and bis(aminomethyl)naphthalene. Any one, two, or more of the diamines can be used for reaction with any one, two or more of the diacids to form suitable intercalant oligomers and polymers.

Examples of suitable diacids for reaction with the diamine include the straight-chain, aliphatic alpha-omega-dicarboxylic acids having 4 to 20 carbon atoms, such as succinic acid;

glutaric acid; pimelic acid; suberic acid; azelaic acid; adipic acid; sebacic acid; undecanedioic acid; dodecanedioic acid, and combinations of any two or more diacids.

Other diacids that are suitable for reaction with the diamines, in addition to the above straight-chain, aliphatic alpha-omega-dicarboxylic acids, include aromatic dicarboxylic acids, such as terephthalic acid; isophthalic acid; 2,6-naphthalenedicarboxylic acid, and combinations of two or more aromatic dicarboxylic acids. All dicarboxylic acids are useful in forming the intercalant oligomers or polymers. The intercalant oligomers formed from the above-mentioned diamine/diacid do not suffer from the Hoffmann elimination reaction which has been identified as the main source for poor thermal stability of transfer traditional onium ion treated clays.

Examples are of the oligomeric xylylenediamine-containing intercalants are shown as formulas BAB and BABAB, as follows, wherein at least one of the terminal amine functionalities is protonated:

organic solvent for the intercalant compound) to achieve better sorption of the organic intercalant compound between the platelets of the layered silicate material. Regardless of the concentration of intercalant compound in the intercalant carrier, the intercalating composition should have an intercalant compound:layered silicate material weight ratio of at least 1:20, preferably at least 1:10, more preferably at least 1:5, to achieve efficient ion-exchange of the intercalant compound with an inner surface of a platelet of the layered silicate material. The intercalant compound sorbed between and bonded to the silicate platelets causes surprising separation or added spacing between adjacent silicate platelets has unexpected thermal stability as well as providing excellent thermal stability to matrix polymers that the intercalates and exfoliates are dispersed within.

For simplicity of description, the above-described protonated amine-functional monomers, oligomers and polymers are hereinafter called the "intercalant" or "surface modifier" or "intercalant surface modifier". The intercalant will be

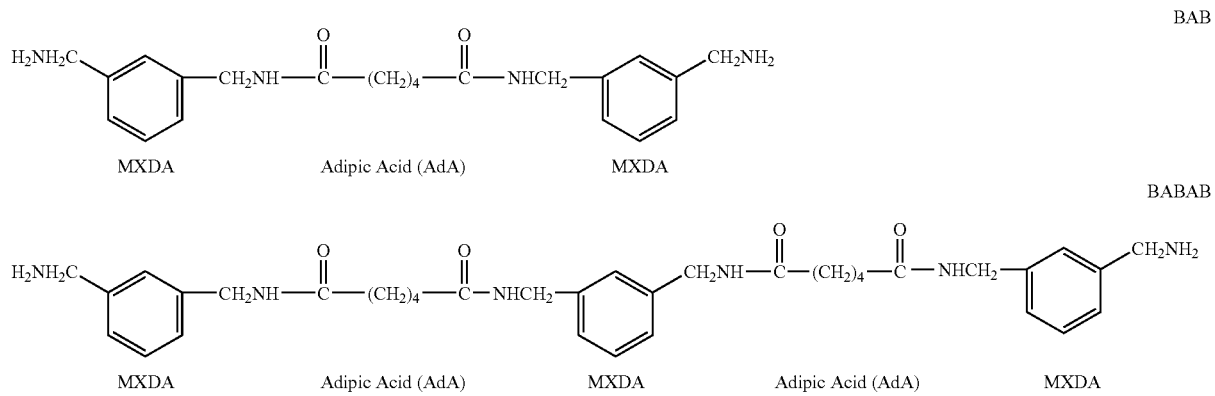

Sufficient intercalant is sorbed between adjacent phyllosilicate platelets to expand the spacing between adjacent platelets (interlayer spacing) a distance of at least about 5 Å, preferably at least about 8 Å (as measured after water removal to a maximum water content of 5% by weight, based on the dry weight of the layered material) and more preferably to an interlayer spacing in the range of about 15-25 Å, so that the intercalate easily can be exfoliated, sometimes naturally without shearing being necessary. At times, the intercalate requires shearing that easily can be accomplished, e.g., when mixing the intercalate with a polar organic solvent carrier, such as a polar organic hydrocarbon, and/or with a polymer melt to provide a platelet-containing composite material or nanocomposite—the platelets being obtained by exfoliation of the intercalated layered-material, e.g., phyllosilicate.

The protonated amine functionality ion-exchanges with an interlayer cation, e.g., $Na^+$, $Ca^{++}$, $Mg^{++}$, $Al^{+++}$, on the inner surfaces of the phyllosilicate platelets so that it is sorbed between, and is maintained bonded to the silicate platelets after exfoliation.

The intercalant compound is intercalated into the layered silicate material by contacting the layered material with an intercalating composition containing the intercalant compound in a concentration of at least about 2%, preferably at least about 5% by weight, more preferably at least about 10% by weight intercalant compound, and most preferably about 20% to about 80% by weight, based on the weight of intercalant compound and carrier (e.g., water, with or without an sorbed and ion-exchanged sufficiently to increase the interlayer spacing of the phyllosilicate in the range of about 5 Å to about 100 Å, preferably at least about 8 Å for easier and more complete exfoliation, in a commercially viable process, regardless of the particular layered material, e.g., phyllosilicate, or intercalant.

It has been found that a phyllosilicate, such as a smectite clay, can be intercalated sufficiently for subsequent exfoliation by sorption of the above-described surface-modifier intercalant compounds having a protonated amine functionality.

Such intercalated phyllosilicates easily can be exfoliated into individual phyllosilicate platelets before or during admixture with a matrix polymer to provide a polymer/intercalate and/or polymer/exfoliate nanocomposite composition to enhance one or more properties of a matrix polymer.

Sorption of the intercalant should be sufficient to achieve expansion of the interlayer spacing of adjacent platelets of the layered material (when measured dry) at least about 5 Å, preferably at least about 8 Å, more preferably to achieve a spacing of at least about 10 Å and most preferably a spacing of about 15 Å. To achieve intercalates that can be exfoliated easily using the intercalants disclosed herein, the weight ratio of intercalant to layered material, preferably a water-swellable smectite clay, such as sodium bentonite, in the intercalating composition should be at least about 1:20, preferably at least about 1:12 to 1:10, more preferably at least about 1:5. It is preferred that the concentration of intercalant in the intercalating composition, based on the total weight of intercalant plus intercalant carrier (water plus any organic liquid solvent) in the intercalating composition is at least about 15% by weight, more preferably at least about 20% by weight intercalant, for example about 20-30% to about 90% by weight intercalant, based on the weight of intercalant plus intercalating carrier in the intercalating composition during intercalation of the layered material.

Interlayer spacings sufficient for exfoliation are achieved by direct intercalation of the above-defined intercalants, preferably without prior sorption of an onium or silane coupling agent, and provide easier and more complete exfoliation, and surprising thermal stability, when dispersed in a thermoplastic or thermosetting polymer to form a nanocomposite composition. Such intercalates and/or exfoliates also are especially useful in admixture with matrix thermoplastic or thermosetting polymer melts in the manufacture of polymeric articles.

Once exfoliated, the platelets of the intercalate are predominantly completely separated into individual platelets and the originally adjacent platelets no longer are retained in a parallel, spaced disposition, but are free to move as predominantly individual intercalant-coated (continuously or discontinuously) platelets throughout a polymer melt for enhancing one or more properties, such as strength gas and liquid barrier properties, and particularly temperature resistance. The predominantly individual phyllosilicate platelets, having their platelet surfaces bonded to intercalant molecules, are randomly, homogeneously and uniformly dispersed, predominantly as individual platelets, throughout a matrix polymer to prevent thermal degradation of the matrix polymer in which they are dispersed.

As recognized, the thickness of the exfoliated, individual platelets (about 10 Å) is relatively small compared to the size of the flat opposite platelet faces. The platelets have an aspect ratio in the range of about 50 to about 500. Dispersing such finely divided platelet particles into a polymer melt imparts a very large area of contact between polymer melt or carrier and platelet particles, for a given volume of particles in the composite, and a high degree of platelet homogeneity in the composite material. Platelet particles of high strength and modulus, dispersed at sub-micron size (nanoscale), impart greater mechanical reinforcement to a polymer and a surprisingly greater protection against thermal degradation than do comparable loadings of conventional reinforcing fillers of micron size, and impart lower permeability and UV protection to matrix polymers than do comparable loadings of conventional fillers.

DETAILED DESCRIPTION OF THE PREFERRED EMBODIMENTS

To form the intercalated and exfoliated materials described herein, the layered material, e.g., the phyllosilicate, should be intercalated by an oligomer or polymer intercalant that is a reaction product of at least one diamine with at least one diacid, preferably a dicarboxylic acid. The oligomer or polymer may be formed in-situ by contacting the layered phyllosilicate with polymerizable monomer reactants using conditions to cause reaction and polymerization in the intercalating composition and intercalation of the resulting oligomer and/or polymer. An amine functionality on the oligomer or polymer is protonated for ion-exchange with interlayer cations of the phyllosilicate to bond the intercalant molecules to the phyllosilicate platelets, at the protonated amine functionalities, at negative charge sites previously occupied by the interlayer cations.

In accordance with a preferred embodiment of the intercalates, exfoliates and nanocomposite compositions described herein, the phyllosilicate should include at least 4% by weight water, up to about 10,000% by weight water, based on the dry weight of the phyllosilicate, preferably about 25% to about 8,000% water, more preferably about 100% to about 5,000% by weight water, prior to or during contact with the intercalant, or its monomeric reactants (at least one diamine and at least one diacid) to achieve sufficient intercalation. Preferably, the phyllosilicate should include at least about 4% by weight water before contact with the intercalating carrier for efficient intercalation. The amount of intercalant in contact with the phyllosilicate from the intercalating composition, for efficient exfoliation, should provide an intercalant/phyllosilicate weight ratio (based on the dry weight of the phyllosilicate) of at least about 1:20, preferably at least about ⅕, and more preferably about ⅖, to provide efficient sorption and ion-exchange of the intercalant between the platelets of the layered material, e.g., phyllosilicate.

The intercalants are introduced in the form of a solid or liquid composition (neat or aqueous, with or without an organic solvent, e.g., an aliphatic hydrocarbon, such as heptane) having an intercalant concentration of at least about 2%, preferably at least about 5% by weight intercalant, more preferably at least about 50% to about 100% by weight intercalant in the intercalating composition, based on the dry weight of the layered material, for intercalant sorption. The intercalant can be added as a solid with the addition to the layered material/intercalant blend of about 20% water, preferably at least about 30% water to about 5,000% water or more, based on the dry weight of layered material. Preferably about 30% to about 50% water, more preferably about 30% to about 40% water, based on the dry weight of the layered material, is included in the intercalating composition when extruding or pug milling, so that less water is sorbed by the intercalate, thereby necessitating less drying energy after intercalation. The intercalants may be introduced into the spaces between every layer, nearly every layer, or at least a predominance (more than 50%) of the layers of the layered material such that the subsequently exfoliated platelet particles are, preferably, predominantly less than about 5 layers in thickness, particularly 3 layers or fewer; more preferably, predominantly about 1 or 2 layers in thickness; and most preferably, predominantly (more than 50%) single platelets, with the remainder, if any, being tactoids of 2 or more platelets.

Any swellable layered material that sufficiently sorbs the intercalant to increase the interlayer spacing between adjacent phyllosilicate platelets at least about 5 Å, preferably at least about 8 Å (when the phyllosilicate is measured dry) may be used in the practice of this invention. Useful swellable layered materials include phyllosilicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; mica; synthetic silicates, and the like. Other useful layered materials include micaceous minerals, such as illite and mixed layered illite/smectite minerals, such as rectorite, tarosovite, ledikite and admixtures of illites with the clay minerals named above. Preferably, the phyllosilicate has a negative charge density in the range of about 0.025 to about 0.200 equivalents per 100 grams of phyllosilicate with platelet layers having a thickness of about 5 Å to about 100 Å.

Other layered materials having little or no charge on the platelet layers may be useful in this invention provided they can be intercalated with the intercalants to expand their interlayer spacing at least about 5 Å, preferably at least about 8 Å. Most preferred layered materials are smectite clay minerals such as montmorillonite, nontronite, beidellite, volkonskoite, hectorite, saponite, sauconite, sobockite, stevensite, and svinfordite.

As used herein the "interlayer spacing" refers to the distance between the internal faces of the adjacent layers as they are assembled in the layered material before any delamination (exfoliation) takes place. The interlayer spacing is measured when the layered material is "air dry", e.g., contains about 3-6% by weight water, e.g., 5% by weight water based on the dry weight of the layered material. The preferred clay materials generally include interlayer cations such as $Na^+$, $Ca^{+2}$, $K^+$, $Mg^{+2}$, $Al^{+3}$, $NH_4^+$ and the like, including mixtures thereof.

The amount of intercalant intercalated into the swellable layered materials useful in this invention, in order that the intercalated layered material platelets surfaces sufficiently ion-exchange with the intercalant molecules such that the layered material may be easily exfoliated or delaminated into individual platelets, may vary substantially between about 2%, preferably at least about 10%, and about 20%, based on the dry weight of the layered silicate material. In the preferred embodiments of the invention, amounts of intercalants employed, with respect to the dry weight of layered material being intercalated, will preferably range from about 8 grams of intercalant 100 grams of layered material (dry basis), preferably at least about 10 grams of intercalant 100 grams of layered material to about 200 grams intercalant 100 grams of layered material. More preferred amounts are from about 20 grams intercalant per 100 grams of layered material to about 60 grams intercalant per 100 grams of layered silicate material (dry basis).

The intercalant(s) can be intercalated into the interlayer spaces of the layered silicate material in a number of ways. Preferred is a solution/dispersion method wherein the intercalant is combined with an intercalating carrier, e.g., water and/or an organic solvent for sorption between the adjacent silicate layers. Another efficient method for intercalating the intercalant is by extrusion processing the intercalant and the layered silicate material in the presence of carriers, e.g., by extrusion or pug-milling.

The intercalating carrier, e.g., water, with or without an organic solvent, can be added directly to the phyllosilicate prior to adding the intercalant, either dry or in solution. Sorption of the intercalant molecules may be performed by exposing the layered material to dry or liquid intercalants in the intercalating composition containing at least about 2% by weight, preferably at least about 5% by weight intercalant, more preferably at least about 50% intercalant, based on the dry weight of the layered material. Sorption may be aided by exposure of the intercalating composition to heat, pressure, ultrasonic cavitation, or microwaves.

The intercalants are introduced into (sorbed within) the interlayer spaces of the layered material in one of two ways. In one method of intercalating, the layered material is intimately mixed, e.g., by extrusion or pug milling, to form an intercalating composition comprising the layered material, in an intercalant and water solution, or intercalant, water and an organic carrier for the intercalant. To achieve sufficient intercalation for exfoliation, the layered material/intercalant blend contains at least about 8% by weight, preferably at least about 10% by weight intercalant, based on the dry weight of the layered material. The intercalant carrier (preferably water, with or without an organic solvent) can be added by first solubilizing or dispersing the protonated intercalant in the carrier; or a dry intercalant and relatively dry phyllosilicate (preferably containing at least about 4% by weight water) can be blended and the intercalating carrier added to the blend, or to the phyllosilicate prior to adding the dry intercalant. In every case, it has been found that excellent sorption and complexing of intercalant between platelets is achieved at relatively low loadings of intercalating carrier, especially $H_2O$, e.g., at least about 4% by weight water, based on the dry weight of the phyllosilicate. When intercalating the phyllosilicate in slurry form (e.g., 900 pounds water, 100 pounds phyllosilicate, 25 pounds intercalant) the amount of water can vary from a preferred minimum of at least about 30% by weight water, with no upper limit to the amount of water in the intercalating composition (the phyllosilicate intercalate is easily separated from the intercalating composition).

In accordance with an extrusion method of intercalating the intercalant between the platelets of the layered material and exfoliating the intercalate, the layered material is blended with a water and/or organic solvent solution of an intercalant in a ratio sufficient to provide at least about 8% by weight, preferably at least about 10% by weight intercalant, based on the dry weight of the layered material. The blend then preferably is extruded for faster intercalation of the intercalant into the layered material.

In accordance with an important feature of the intercalants, exfoliates, and nanocomposite compositions described herein, the intercalated phyllosilicate can be manufactured in a concentrated from, e.g., 10-200%, preferably 20-100% oligomer or polymer intercalant or other matrix oligomer or polymer and 10-90%, preferably 20-80% intercalated phyllosilicate.

The intercalants or surface modifiers can be exfoliated and dispersed into one or monomers, oligomers, polymers or blends of melt-processible thermoplastic and/or thermosetting materials, or mixtures thereof. Matrix polymers for use in this embodiment of the process of this invention may vary widely, the only requirement is that they are melt processible. In this embodiment of the invention, the polymer includes at least ten (10), preferably at least thirty (30) recurring monomeric units. The upper limit to the number of recurring monomeric units is not critical, provided that the melt index of the matrix polymer under use conditions is such that the matrix polymer forms a flowable mixture. Most preferably, the matrix polymer includes from at least about 10 to about 100 recurring monomeric units. In the most preferred embodiments of this invention, the number of recurring units is such that the matrix polymer has a melt index of from about 0.01 to about 12 grams per 10 minutes at the processing temperature.

Thermoplastic resins for use as matrix polymers in the practice of this invention may vary widely. Illustrative of useful thermoplastic resins, which may be used alone or in admixture, are polyactones such as poly(pivalolactone), poly(caprolactone) and the like; polyurethanes derived from reaction of diisocyanates such as 1,5-naphthalene diisocyanate; p-phenylene diisocyanate, m-phenylene diisocyanate, 2,4-toluene diisocyanate, 4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane and the like and linear long-chain diols such as poly(tetramethylene adipate), poly(ethylene adipate), poly(1,4-butylene adipate), poly(ethylene succinate), poly(2,3-butylene succinate), polyether diols and the like; polycarbonates such as poly[methane bis(4-phenyl) carbonate], poly[1,1-ether bis(4-phenyl) carbonate], poly[diphenylmethane bis(4-phenyl)carbonate], poly[1,1-cyclohexane bis(4-phenyl)carbonate] and the like; polysulfones; polyethers; polyketones; polyamides such as poly(4-amino butyric acid), poly(hexamethylene adipamide), poly(6-aminohexanoic acid), poly(m-xylylene adipamide), poly(p-xylylene sebacamide), poly(2,2,2-trimethyl hexamethylene terephthalamide), poly(metaphenylene isophthalamide) (NOMEX), poly(p-phenylene terephthalamide) (KEVLAR), and the like; polyesters such as poly(ethylene azelate), poly(ethylene-1,5-naphthalate, poly(1,4-cyclohexane dimethylene terephthalate), poly(ethylene oxybenzoate) (A-TELL), poly(para-hydroxy benzoate) (EKONOL), poly(1,4-cyclohexylidene dimethylene terephthalate) (KODEL) (cis), poly(1,4-cyclohexylidene dimethylene terephthalate) (KODEL) (trans), polyethylene terephthalate, polybutylene terephthalate and the like; poly(arylene oxides) such as poly(2,6-dimethyl-1,4-phenylene oxide), poly(2,6-diphenyl-1,4-phenylene oxide) and the like; poly(arylene sulfides) such as poly(phenylene sulfide) and the like; polyetherimides; vinyl polymers and their copolymers such as polyvinyl acetate, polyvinyl alcohol, polyvinyl chloride; polyvinyl butyral, polyvinylidene chloride, ethylene-vinyl acetate copolymers, and the like; polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylamide, polyacrylonitrile, polyacrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated butadiene-styrene copolymers and the like; polyolefins such as low density poly(ethylene), poly(propylene), chlorinated low density poly(ethylene), poly(4-methyl-1-pentene), poly(ethylene), poly(styrene), and the like; ionomers; poly(epichlorohydrins); poly(urethane) such as the polymerization product of diols such as glycerin, trimethylol-propane, 1,2,6-hexanetriol, sorbitol, pentaerythritol, polyether polyols, polyester polyols and the like with a polyisocyanate such as 2,4-tolylene diisocyanate, 2,6-tolylene diisocyante, 4,4'-diphenylmethane diisocyanate, 1,6-hexamethylene diisocyanate, 4,4'-dicyclohexylmethane diisocyanate and the like; and polysulfones such as the reaction product of the sodium salt of 2,2-bis(4-hydroxyphenyl) propane and 4,4'-dichlorodiphenyl sulfone; furan resins such as poly(furan); cellulose ester plastics such as cellulose acetate, cellulose acetate butyrate, cellulose propionate and the like; silicones such as poly(dimethyl siloxane), poly(dimethyl siloxane co-phenylmethyl siloxane), and the like; protein plastics; and blends of two or more of the foregoing.

Useful thermosetting resins useful as matrix polymers include, for example, the polyamides; polyalkylamides; polyesters; polyurethanes; polycarbonates; polyepoxides; and mixtures thereof.

Most preferred thermoplastic polymers for use as a matrix polymer are thermoplastic polymers such as polyamides, polyesters, and polycarbonates. Polyamides of this type include polymers, generally known in the art as polyamides, obtained from diamines and diacids having the recurring unit represented by the general formula:

in which $R^1$ is an alkylene group of at least 2 carbon atoms, preferably from about 2 to about 11, or arylene having at least about 6 carbon atoms, preferably about 6 to about 17 carbon atoms; and $R^2$ is selected from $R^1$ and aryl groups. Also, included are copolyamides obtained by known methods, for example, by polycondensation of hexamethylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6), poly(hexamethylene sebacamide) (nylon 6,10), poly(hexamethylene isophthalamide), poly(hexamethylene terephthalamide), poly(heptamethylene pimelamide) (nylon 7,7), poly(octamethylene sebacamide) (nylon 8,8), poly(nonamethylene azelamide) (nylon 9,9) poly(decamethylene azelamide) (nylon 10,9), poly(decamethylene sebacamide) (nylon 10,10), poly[bis(4-amino cyclohexyl)methane-1,10-decane-carboxamide]], poly(m-xylylene adipamide), poly(p-xylylene sebacamide), poly(2,2,2-trimethyl hexamethylene terephthalamide), poly(piperazine sebacamide), poly(p-phenylene terephthalamide), poly(metaphenylene isophthalamide), poly(ethylene adipamide) (Polyamide 26), poly(tetramethylene adipamide) (Polyamide 46), poly(octamethylene adipamide) (Polyamide 86), poly(hexamethylene azelamide) (Polyamide 69), poly(hexamethylene sebacamide) (Polyamide 610), poly(hexamethylene dodecanoamide) (Polyamide 612), poly(decamethylene adipamide) (Polyamide 106), poly(dodecamethylene dodecanoamide) (Polyamide 1212), poly(caproamide-co-hexamethylene adipamide) (Polyamide 6/66), Poly(hexamethylene isophthalamide) (Polyamide 6I), poly(hexamethylene terephthalamide) (Polyamide 6T), poly(hexamethylene terephthalamid-co-isophthalamid) (Polyamide 6T/6I), poly(hexamethylene terephthalamid-co-isophthalamid-co-adipamide), (Polyamide 6T/6I/66), poly(nonamethylene terephthalamide) (Polyamide 9T), poly(trimethylhexamethylene terephthalamide) (Polyamide 6-3-T), poly(m-xylyene azelamide) (Polyamide MXD9), poly(m-xylyene sebacamide) (Polyamide MXD10), poly(m-xylyene dodecanoamide) (Polyamide MXD12), and the like.

Preferred polyamides for use as a matrix polymer are the same as the intercalant.

Other matrix or host polymers which may be employed in admixture with exfoliates to form nanocomposites are linear polyesters. The type of polyester is not critical and the particular polyesters chosen for use in any particular situation will depend essentially on the physical properties and features, i.e., tensile strength, modulus and the like, desired in the final form. Thus, a multiplicity of linear thermoplastic polyesters having wide variations in physical properties are suitable for use in admixture with exfoliated layered material platelets in manufacturing nanocomposites in accordance with this invention.

The particular polyester chosen for use as a matrix polymer can be a homo-polyester or a copolyester, or mixtures thereof, as desired. Polyesters are normally prepared by the condensation of an organic dicarboxylic acid and an organic diol, and, the reactants can be added to the intercalates, or exfoliated intercalates for in situ polymerization of the polyester while in contact with the layered material, before or after exfoliation of the intercalates.

Polyesters which are suitable for use as matrix polymers in this embodiment of the invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters.

Exemplary of useful cycloaliphatic, aliphatic and aromatic polyesters which can be utilized as matrix polymers in the practice of this embodiment of the invention are poly(ethylene terephthalate), poly(cyclohexylenedimethylene terephthalate), poly(ethylene dodecate), poly(butylene terephthalate), poly[ethylene(2,7-naphthalate)], poly(methaphenylene isophthalate), poly(glycolic acid),poly(ethylene succinate), poly(ethylene adipate), poly(ethylene sebacate), poly(decamethylene azelate), poly(decamethylene adipate), poly(decamethylene sebacate), poly(dimethylpropiolactone), poly(para-hydroxybenzoate) (EKONOL), poly(ethylene oxybenzoate) (A-tell), poly(ethylene isophthalate), poly(tetramethylene terephthalate), poly(hexamethylene terephthalate), poly(decamethylene terephthalate), poly(1,4-cyclohexane dimethylene terephthalate) (trans), poly(ethylene 1,5-naphthalate), poly(ethylene 2,6-naphthalate), poly(1,4-cyclohexylidene dimethylene terephthalate), (KODEL) (cis), and poly(1,4-cyclohexylidene dimethylene terephthalate (KODEL) (trans).

Polyester compounds prepared from the condensation of a diol and an aromatic dicarboxylic acid are especially suitable as matrix polymers in accordance with this embodiment of the present invention. Illustrative of such useful aromatic carboxylic acids are terephthalic acid, isophthalic acid and o-phthalic acid, 1,3-naphthalene-dicarboxylic acid, 1,4-naphthalenedicarboxylic acid, 2,6-naphthalenedicarboxylic acid, 2,7-naphthalene-dicarboxylic acid, 4,4'-diphenyldicarboxylic acid, 4,4'-diphenylsulfone-dicarboxylic acid, 1,1,3-trimethyl-5-carboxy-3-(p-carboxyphenyl)-idane, diphenyl ether 4,4'-dicarboxylic acid, bis-p(carboxy-phenyl) methane and the like. Of the aforementioned aromatic dicarboxylic acids, those based on a benzene ring (such as terephthalic acid, isophthalic acid, orthophthalic acid) are preferred for use in the practice of this invention. Among these preferred acid precursors, terephthalic acid is particularly preferred acid precursor.

The most preferred matrix polymer for incorporation with exfoliates manufactured in accordance with the present invention is a polymer selected from the group consisting of poly(ethylene terephthalate), poly(butylene terephthalate), poly(1,4-cyclohexane dimethylene terephthalate), a polyvinylimine, and mixtures thereof. Among these polyesters of choice, poly(ethylene terephthalate) and poly(butylene terephthalate) are most preferred.

In accordance with an important feature of the present invention, the intercalate and/or platelet/carrier compositions of the present invention can be manufactured in a concentrated form, e.g., as a master batch or concentrate composition, e.g., having about 10-200%, preferably about 20-80% intercalate and/or exfoliated platelets of layered material and about 10-200%, preferably about 20-80% matrix polymer. The master batch can be later diluted and mixed with additional matrix polymer to form a desired nanocomposite composition.

Eventual exfoliation of the intercalated layered material preferably should provide delamination of at least about 90% by weight of the intercalated material to provide a more viscous composition comprising a carrier or solvent having intercalant-complexed platelet particles substantially homogeneously dispersed therein. Some intercalates require a shear rate that is greater than about $10 \sec^{-1}$ for such relatively thorough exfoliation. Other intercalates exfoliate naturally or by heating, or by applying low pressure, e.g., 0.5 to 60 atmospheres above ambient, with or without heating. The upper limit for the shear rate is not critical. In the particularly preferred embodiments of the invention, when shear is employed for exfoliation, the shear rate is from greater than about $10 \sec^{-1}$ to about $20,000 \sec^{-1}$, and in the more preferred embodiments of the invention the shear rate is from about $100 \sec^{-1}$ to about $10,000 \sec^{-1}$.

When shear is employed for exfoliation, any method which can be used to apply a shear to the intercalant/carrier composition can be used. The shearing action can be provided by any appropriate method, as for example by mechanical means, by thermal shock, by pressure alteration, or by ultrasonics, all known in the art. In particularly useful procedures, the composition is sheared by mechanical methods in which the intercalate, with or without the carrier or solvent, is sheared by use of mechanical means, such as stirrers, Banbury® type mixers, Brabender® type mixers, long continuous mixers, and extruders. Another procedure employs thermal shock in which shearing is achieved by alternatively raising or lowering the temperature of the composition causing thermal expansions and resulting in internal stresses which cause the shear. In still other procedures, shear is achieved by sudden pressure changes in pressure alteration methods; by ultrasonic techniques in which cavitation or resonant vibrations which cause portions of the composition to vibrate or to be excited at different phases and thus subjected to shear. These methods of shearing are merely representative of useful methods, and any method known in the art for shearing intercalates may be used.

Mechanical shearing methods may be employed such as by extrusion, injection molding machines, Banbury® type mixers, Brabender® type mixers and the like. Shearing also can be achieved by introducing the layered material and intercalant at one end of an extruder (single or double screw) and receiving the sheared material at the other end of the extruder. The temperature of the layered material/intercalant composition, the length of the extruder, residence time of the composition in the extruder and the design of the extruder (single screw, twin screw, number of flights per unit length, channel depth, flight clearance, mixing zone, etc.) are several variables which control the amount of shear to be applied for exfoliation.

Exfoliation should be sufficiently thorough to provide at least about 80% by weight, preferably at least about 85% by weight, more preferably at least about 90% by weight, and most preferably at least about 95% by weight delamination of the layers to form two layer tactoids that include three platelets or less, more preferably, individual platelet particles that can be substantially homogeneously dispersed in the carrier or solvent. As formed by this process, the platelet particles or platelet multi-layer tactoids dispersed in the carrier or solvent have the thickness of the individual layers plus one to five monolayer thicknesses of complexed, or small multiples less than about 10, preferably less than about 5 and more preferably about 3 or less of the layers, and still more preferably 1 or 2 layers. In the preferred embodiments of this invention, intercalation and delamination of every interlayer space is complete so that all or substantially all (less than about 2% by weight tactoids of more than one aggregated platelet) individual layers delaminate one from the other to form separate platelet particles for admixture with the carrier or solvent. The compositions can include the layered material as all intercalate, completely without exfoliation, initially to provide relatively low viscosities for transportation and pumping until it is desired to increase viscosity via easy exfoliation. In cases where intercalation is incomplete between some layers, those layers will not delaminate in the carrier or solvent, and will form platelet particles comprising those layers in a coplanar aggregate.

Molding compositions comprising a thermoplastic or thermosetting polymer containing a desired loading of platelets obtained from exfoliation of the intercalates manufactured according to the invention are outstandingly suitable for the production of sheets and panels having valuable properties.

Such sheets and panels may be shaped by conventional processes such as vacuum processing or by hot pressing to form useful objects having substantially increased thermal stability can be heated to substantially higher temperatures without thermal degradation of the intercalates, exfoliates thereof, or the resulting nanocomposite compositions. The sheets and panels according to the invention are also suitable as coating materials for other materials comprising, for example, wood, glass, ceramic, metal or other plastics, and outstanding strengths can be achieved using conventional adhesion promoters, for example, those based on vinyl resins. The sheets and panels can also be laminated with other plastic films and this is preferably effected by co-extrusion, the sheets being bonded in the molten state. The surfaces of the sheets and panels, including those in the embossed form, can be improved or finished by conventional methods, for example by lacquering or by the application of protective films.

Matrix polymer/platelet composite materials (nanocomposites) are especially useful for fabrication of non-stretched film, stretched film, multilayer film, multilayer stretched film, sheets, multilayer sheets, paper-laminated bodies, (multilayer) hollow containers, such as bottles, cups, trays, tubes, and tanks, connectors, caps, or valves. Although not specifically limited, these shaped articles are preferably produced by a melt molding method such as by T-die extrusion, injection blow molding, co-extrusion blow molding, injection molding, and multilayer injection molding. For example, a non-stretched film or sheet may be produced by using a Tie-die extruder. The non-stretched sheet or film is stretched in the machine direction and/or the transverse direction to produce a stretched film, or deep-drawn into cups, trays, and the like. Bottles, tanks, and the like, can be produced by blow-molding a (multilayer) tubular parison which is formed using an injection molding machine or an extruder. The multilayer injection molding includes, but is not limited to, two-color molding, insert molding, and co-injection molding. A recycle layer may be provided in multilayer films and in multilayer containers.

The matrix polymer/platelet composite materials fabrication may contain another resin such as polyamide-6, polyamide-66, polyamide-6,66, polyamide-6IT, polyester, polyolefin, and modified polyolefin in accordance with the nanocomposite compositions described herein. In addition, the fabrication of the nanocomposite compositions may further contain one or more additives. Examples of such additives include an inorganic filler, such as glass fiber and carbon fiber; a flat inorganic filler, such as glass flake, talc, and kaolin; an impact modifier such as elastomers; a nucleating agent; a lubricant, such as an amide of one or more fatty acids and/or metal salts of fatty acids; an antioxidant, such as copper compounds, organic or inorganic halogen compounds, hindered phenols, hindered amines, hydrazines, sulfur compounds, and phosphorus compounds; a heat stabilizer; an anti-coloring agent; an ultraviolet absorber; a releasing agent; a plasticizer; a coloring agent; and a fire retardant.

The following specific examples are presented to more particularly illustrate the preparation of a very limited number of preferred intercalants, intercalates, exfoliates, and nanocomposite compositions and are not to be construed as limitations thereon.

Preferred Oligomeric Surface Modifier Intercalants:

The preferred surface modifier intercalants have at least one amine moiety as a terminal group, preferably an m-xylylene-containing polyamide oligomer formed by reacting m-xylylenediamine with a diacid, preferably a dicarboxylic acid. More preferred is an intercalant surface modifier composed of more than 10 molar % m-xylylenediamine as the diamine component and having a weight average of molecular weight in the range of about 100 to about 3000, more preferably about 200 to about 1500.

The intercalates formed by treatment with the surface modifier intercalants described herein, including an m-xylylene component, have superior heat resistance against high temperatures used in the polymerization process and extrusion process commonly used to make polyamide nanocomposite compositions. Moreover, polyamide nanocomposite compositions containing the intercalates described herein show superior heat resistance to temperature decomposition, gel formation, and the like during molding processes. In addition, the intercalates are ideally suited for dispersing into an m-xylylene-containing polyamide matrix polymer and exfoliated intercalates disperse homogeneously in any polyamide matrix polymer. The dispersibility of the intercalates and exfoliates are easily accomplished during the polymerization or extrusion process due to their compatibility and homogeneous dispersibility with polyamides.

The polyamide intercalants are the polyamide oligomers or polymers derived from a xylylenediamine as a main diamine component and an alpha,omega-straight chain aliphatic dicarboxylic acid as a main dicarboxylic acid component. The xylylenediamine may be m-xylylenediamine, p-xylylenediamine, or a mixture of both. Preferred as the xylylenediamine are m-xylylenediamine and a mixture of p- and m-xylylenediamines containing not more than 40 mole % of p-xylylenediamine. Preferably, the m-xylylenediamine accounts for at least 85 mole %, especially at least 90 mole %, most preferably at least 95 mole %, of the entire diamine components.

Other diamines that can be used include, for example, tetramethylenediamine; pentamethylenediamine; 2-methylpentanediamine; hexamethylenediamine; heptamethylenediamine; octamethylenediamine; nonamethylenediamine; decamethylenediamine; dodecamethylenediamine; 2,2,4-trimethylhexamethylenediamine; and 2,4,4-trimethylhexamethylenediamine; examples of alicyclic diamines include 1,3-bis(aminomethyl)cyclohexane; 1,4-bis(aminomethyl)cyclohexane; 1,3-diaminocyclohexane; 1,4-diaminocyclohexane; bis(4-aminocyclohexyl)methane; 2,2-bis(4-aminocyclohexyl)propane; bis(aminomethyl)decalin; and bis(aminomethyl)tricyclodecane; and examples of suitable aromatic diamines include bis(4-aminophenol)ether; p-phenylenediamine; p-xylylenediamine; and bis(aminomethyl)naphthalene. Any one, two, or more of the diamines can be used for reaction with any one, two or more of the diacids to form suitable intercalant oligomers and polymers.

The dicarboxylic acid component of the polyamide intercalant is composed mainly of the alpha,omega-straight chain aliphatic dicarboxylic acid. Preferably, the alpha,omega-straight chain aliphatic dicarboxylic acid has 4 to 20 carbon atoms. Examples include succinic acid; glutaric acid; pimelic acid; suberic acid; azelaic acid; adipic acid; sebacic acid; undecanedioic acid; dodecanedioic acid, and combinations of any two or more diacids.

Other diacids that are suitable for reaction with the diamines, in addition to the above straight-chain, aliphatic alpha-omega-dicarboxylic acids, include aromatic dicarboxylic acids, such as terephthalic acid; isophthalic acid; 2,6-naphthalenedicarboxylic acid, and combinations of two or more aromatic dicarboxylic acids.

The amount of the alpha,omega-straight chain aliphatic dicarboxylic acid is preferably at least 50 mole %, more preferably at least 70 mole %, of the entire dicarboxylic acid components.

The m-xylylene group-containing polyamide oligomer intercalant is an oligomer or polymer containing at least 50 mole %, preferably at least 70 mole % of a unit, which consists of m-xylylenediamine or a mixed xylylenediamine of m-xylylenediamine and p-xylylenediamine.

Examples of the metaxylylene group-containing polyamide oligomer intercalants are homopolymers such as polymetaxylyleneadipamide, polymetaxylylenesebacamide, polymetaxylylenesuberamide; copolymers, such as m-xylylene/p-xylylene-adipamide copolymer, m-xylylene/p-xylylene-pimelamide copolymer, m-xylylene/p-xylylene-azeramide copolymer; and A copolymer of the monomers composing the above homopolymers or copolymers and other copolymerizable monomers such as aliphatic diamines (e.g. hexamethylenediamine), alicyclic diamines (e.g. piperazine), aromatic diamines (e.g. parabis(2-aminoethyl)benzene), aromatic dicarboxylic acids (e.g. terephthalic acid, isophtalic acid), lactams (e.g. E-caprolactam), co-aminocarboxylic acids (e.g. γ-aminoheptanoic acid), aromatic aminocarboxylic acids (e.g., p-aminomethylbenzoic acid) and the like. In the above copolymer, the content of paraxylylenediamine in the total xylylenediamines is 80% by weight or less and the content of the unit consisting of the xylylenediamines and the dicarboxylic acid in the molecular chain of the copolymer is at least 50, preferably at least 70 mol %. The polymers may optionally be combined with other polymers such as polyamide-6, polyamide-6,6, polyamide-46, polyamide-69, polyamide-6,10, polyamide-6,66, polyamide-11, polyamide-12, polyamide-6I, polyamide-6T, polyamide-6IT and the like in amounts less than about 50% by weight.

Examples of diamines (sometimes abbreviated as base intercalant molecule component B) other than m-xylylenediamine include aliphatic diamines, such as tetramethylenediamine; pentamethylenediamine; 2-methylpentanediamine; hexamethylenediamine; heptamethylenediamine; octamethylenediamine; nonamethylenediamine; decamethylenediamine; dodecamethylenediamine; 2,2,4-trimethylhexamethylenediamine; and 2,4,4-trimethylhexamethylenediamine; examples of alicyclic diamines include 1,3-bis(aminomethyl)cyclohexane; 1,4-bis(aminomethyl)cyclohexane; 1,3-diaminocyclohexane; 1,4-diaminocyclohexane; bis(4-aminocyclohexyl)methane; 2,2-bis(4-aminocyclohexyl)propane; bis(aminomethyl)decalin; and bis(aminomethyl)tricyclodecane; and examples of suitable aromatic diamines include bis(4-aminophenol)ether; p-phenylenediamine; p-xylylenediamine; and bis(aminomethyl)naphthalene. Any one, two, or more of the diamines can be used for reaction with any one, two or more of the diacids.

Examples of suitable diacids (sometimes abbreviated as acid intercalant molecule component A) for reaction with the diamine include the straight-chain, aliphatic alpha-omega-dicarboxylic acids having 4 to 24 carbon atoms, such as succinic acid; glutaric acid; pimelic acid; suberic acid; azelaic acid; adipic acid; sebacic acid; undecanedionic acid; dodecanedionic acid, and combinations of any two or more diacids.

Other diacids that are suitable for reaction with the diamines, in addition to the above straight-chain, aliphatic alpha-omega-dicarboxylic acids, include aromatic dicarboxylic acids, such as terephthalic acid; isophthalic acid; 2,6-naphthalenedicarboxylic acid, and combinations of two or more aromatic dicarboxylic acids. All dicarboxylic acids are useful in forming the intercalant oligomers or polymers.

The polyamide oligomer surface modifier intercalants described herein can be produced by any known method and under any known polymerization conditions without limitation. For example, the surface modifier intercalants can be produced by heating the polyamide salt composed of one or more diamines with one or more dicarboxylic acids in water under pressure, and then reducing the condensed water from the reaction vessel. In addition, the surface modifier intercalants can be also produced by adding one or more diamine into one or more molten dicarboxylic acids continuously, at elevated temperature under pressure or under normal pressure.

The molecular weight of the polyamide oligomer surface modifier intercalants described herein can be controlled by controlling the charging molar ratio of diamine and dicarboxylic acid or by using an end capping agent such as a monoamine or a monocarboxylic acid, as well known in the art.

The surface modification of the layered material by the intercalant is achieved through an ion exchange reaction. The preferred protonated m-xylylene-containing polyamide oligomer can be dispersed in a polar media, such as water or a water/solvent(s) mixture. Useful solvents include alcohols, ketones, esters and the like. The oligomer dispersion is added to a layered silicate material dispersion, such as a dilute sodium montmorillonite clay/water slurry. It is preferred to carry out the ion exchange (intercalation) reaction at an elevated temperature, e.g., 40 to 100° C., at atmospheric pressure, or correspondingly lower temperature at higher pressure, and to stir the clay/water and/or solvent slurry to achieve uniform ion-exchange reaction with all of the clay. After the ion-exchange reaction, the ion-exchanged clay can settle for separation by gravity by decanting the liquid. This separation process also can be achieved by centrifuging or by vacuum filtration of the liquid from the ion-exchanged (intercalated) clay. The surface-modified layered silicate materials (intercalates) can then be dried and milled to a desired particle size.

Xylelene-Containing Polyamides (Intercalants) and Layered Silicate Materials Intercalated with m-xylylene-Containing, Polyamide Oligomer (Intercalates)

It is preferred to add about 1% to about 10% by weight intercalate to the matrix polymer, e.g., polyamide, to form a nanocomposite composition, more preferably about 1.5% to about 8% by weight intercalate. The improvement in gas and liquid barrier properties of polyamide nanocomposite films containing the intercalates described herein can be obtained with an intercalate content of 0.1% by weight or higher. The transparency of the shaped, e.g., molded, articles and films is equivalent to that of the un-filled matrix resins. The intercalates should be uniformly dispersed throughout the matrix polymer, e.g., polyamide resin, without locally condensed agglomerates. The words "uniformly dispersed" as used herein means that the intercalate is separated into flat silicate platelet layers in the matrix polymer and 50% or more of the separated layers have an interlayer distance of 50 Å or more. The interlayer distance is measured between the gravity centers of adjacent pairs of the separated flat platelet layers. The greater the interlayer distance, the more uniformly the intercalate and its exfoliated platelets are dispersed to provide a final film, sheet or molded article that has an excellent appearance, particularly a high visual transparency and enhanced film gas barrier properties against the permeation of oxygen and/or carbon dioxide.

The incorporation of the intercalates and exfoliates thereof, described herein, into a matrix polymer, preferably into an m-xylylene-containing polyamide, is generally performed by adding the intercalate or the layered material at beginning of, or during, the melt polymerization process for producing the polyamide resin. Alternatively, the m-xylylene-containing polyamide and the intercalate or layered materials described herein can be melt-kneaded in a common extruder, such as a single or twin screw extruder. Incorporation of the intercalates into a matrix polymer, e.g., polyamide, during polyamide polymerization is preferable in view of the increased productivity. For example, the polyamide matrix polymer polymerization process can be carried out by heating salts of one or more diamines and one or more dicarboxylic acids in water under pressure and by removing the condensed water, and the layered silicate material can be added at the beginning of polymerization process so that the intercalant oligomer can form and intercalate into the phyllosilicate. In another type of polyamide polymer polymerization process, one or more diamines is added to one or more molten dicarboxylic acids continuously, at elevated temperature under pressure or under normal pressure, and the intercalate is added to the diamine and/or to the dicarboxylic acid; or the intercalate can be added to the reactor during or after the addition of the diamine component.

The layered silicate material can be added into the polyamide reactants (monomers) that form the polyamide, such as a diamine, and a dicarboxylic acid; or added into a polyamide salt resulting from reaction of a diamine and a dicarboxylic acid; or added into a polyamide oligomer having low melt viscosity. Alternatively, a mixture of the silicate and the monomeric polyamide reactants can be prepared in advance of the polymerization process.

As an example of the melt-kneading of a polyamide and the layered silicate material in a twin screw extruder, preferably, melt kneading is conducted at a melt-kneading temperature from the melting point of the polyamide resin to a temperature no higher than about 60° C. above the melting point of the polyamide. The screw configuration of an extruder is preferably constructed from a reverse screw, a kneading disc, a rotor screw, or the like, to ensure efficient dispersion of the intercalates and exfoliates throughout the polyamide matrix polymers.

The preferred polyamide polymer is a m-xylylene-containing polyamide resin produced by the polycondensation of a diamine component comprising 50 mol % or more of m-xylylenediamine and a dicarboxylic acid component comprising 50 mol % or more of a straight-chain, aliphatic alpha-omega-dicarboxylic acid having 4 to 20 carbon atoms.

The content of m-xylylenediamine as a diamine component in the polyamide oligomer intercalant is preferably 50 mol % or more, and more preferably is 70 mol % or more, based on the total moles of diamine components in the polyamide molecules.

Non-Xylylene Containing Polyamides Including Layered Silicate Treated with m-xylylene-Containing Polyamide Oligomer The intercalates described herein are also useful when dispersed into other matrix polymers, particularly other polyamide matrix polymers that do not have an m-xylylene component. The concentration of the intercalates and/or exfoliates in the polyamide matrix polymer composition (nanocomposite composition) is preferably about 1% to about 10% by weight, and more preferably is about 1.5% to about 8% by weight based on the total weight of the nanocomposite composition. The improvement in the gas and liquid barrier properties can be obtained in films containing the intercalates and exfoliates described herein at an intercalant content of at least about 0.5%, preferably at least about 1% by weight based on the total weight of the nanocomposite composition. The transparency of the shaped articles is not lowered when the intercalant content is 10% by weight or higher. The intercalates and exfoliates thereof should be uniformly dispersed throughout the matrix polymer, e.g., polyamide resin, without locally condensed agglomerates.

The matrix polyamide resins useful in the nanocomposite compositions described herein preferably are selected from: polyamide-66; polyamide-6,66; polyamide-610; polyamide-612; polyamide-46; polyamide-6IT; polyamide-9T; and other co-polymerized polyamide resins. Of these polyamides, preferred is a matrix polyamide polymer formed by the reaction of at least one diamine component and at least one dicarboxylic acid component.

The excellent thermal stability of the intercalates and exfoliates and nanocomposite compositions described herein enable the intercalates and exfoliates to be incorporated into matrix polymers having very high melting points, e.g., m.p.>260° C. Polycarbonate, PET and others are in this high melting point category. The incorporation method preferably will be melt compounding.

Typical Testing Methods

1. Terminal Amino Concentration of Polyamide resin; [$NH_2$]

An accurate weight of 0.3 to 0.5 g of polyamide resin is dissolved under stirring in 30 cc of a phenol and an ethanol solvent mixture (4/1 by volume, respectively) at 20° C. to 30° C. After the polyamide resin is completely dissolved, the solution is titrated with 0.01 N hydrochloric acid using an automatic titration apparatus manufactured by Mitsubishi Chemical Corporation. The terminal amino concentration was calculated from the titration results.

2. Terminal Carboxylic Acid Concentration of Polyamide resin; [COOH]

An accurate weight of 0.3 to 0.5 g of polyamide resin was dissolved under stirring in 30 cc of a benzyl alcohol at 160° C. to 180° C. under nitrogen flow. After the polyamide resin was completely dissolved, the solution was cooled down to 80° C. or less, then 10 cc methanol was added and the solution was titrated with 0.01 N sodium hydroxide using an automatic titration apparatus manufactured by Mitsubishi Chemical Corporation. The terminal carboxylic concentration was calculated from the titration results.

3. Molecular Weight

Calculated from following formula:

$$\text{Number-Average Molecular Weight} = 2 \times 10^6 / ([NH_2] + [COOH])$$

4. TGA

TGA was used to evaluated the thermal stability of the treated layered materials. Typical testing conditions are 20-100° C./min in air from 50° C. to 1000° C.

EXAMPLES

Example-1

Preparation of m-xylylene-Containing Polyamide (BAB-Type) Oligomer

Into a jacketed reaction vessel equipped with a stirring device, a partial condenser, a cooler, a dropping funnel, and a nitrogen inlet, 3.40 mols (497 g) of adipic acid was introduced. After replacing the inner atmosphere with nitrogen, adipic acid was uniformly melted at 160° C. under a nitrogen stream. To the molten adipic acid, 6.80 mols (926 g) of m-xylylenediamine was continuously added dropwise under stirring. During the addition, the inner temperature was continuously raised to 220° C. The water distilled off with the addition of m-xylylenediamine and was removed from the reaction vessel through the partial condenser and the cooler. After completing the addition of m-xylylenediamine, the inner temperature was raised to 260° C. and the reaction was continued for 30 minutes. The resultant polyamide oligomer was cooled down and taken out in the form of a solid. The solid polyamide oligomer was ground. 1 kg of ground oligomer was added into 3 liters of distilled water and stirred. After stirring at 40° C. for 1 hour, the oligomer was separated from water through filtering and was dried at 100° C. below 1 torr for 10 hours.

The obtained oligomer had 2550 micro eq/g of terminal amino and a molecular weight of 780.

Example 2

Preparation of Intercalate with Protonated Polyamide Oligomer in Water/Alcohol mixed Solvent 20 g of montmorillonite (Kunipia-F produced by Kunimine industrial, capacity of ion-exchange: 1.2 meq/g) was added into 2 liters of distilled water and stirred at 80° C. for 2 hours. On the other hand, 10 g of the polyamide oligomer (BAB-type) obtained in example 1 was dissolved in 2 liters of distilled water/methanol (1/1 by volume) at 60° C. for 1 hour under stirring. Then 25 cc of 1N hydrochloric acid was added to ionize (protonate) an amine functionality of the intercalant oligomer. The solvent, including the amine-protonated polyamide oligomer, and the montmorillonite, dispersed in water, were mixed and stirred at 80° C. for 1 hour and the ion-exchange treatment (intercalation) of the montmorillonite clay was performed. After this ion-exchange treatment (intercalation), the settled montmorillonite was separated through filtering and was washed in 3 liters of distilled water. The obtained polyamide-oligomer-silicate (intercalate) was dried at 80° C. for 24 hours.

Example 3

Preparation of Intercalate with Polyamide Oligomer in Water Media Only 50 g of montmorillonite (PG-clay produced by Nanocor, Inc. capacity of ion-exchange; 1.0 meq/g) was added into 2 liters of distilled water and stirred at 80° C. for 2 hours. On the other hand, 19 g of the polyamide oligomer (BAB-type) obtained in example 1 was dissolved in 2 liters of distilled water at 80° C. for 1 hour under stirring. Then 25 cc of 2N hydrochloric acid was added to ionize (protonate) an amine functionality of the intercalant oligomer. The solvent, including the ionized (amine-protonated) polyamide oligomer, and the montmorillonite, dispersed in water, were mixed and stirred at 80° C. for 1 hour and the ion-exchange treatment for montmorillonite clay was performed. After this ion-exchange treatment (intercalation), the settled montmorillonite was separated through filtering and was washed in 3 liter distilled water. The obtained polyamide-oligomer-silicate (intercalate) was dried at 80° C. for 24 hours The modified montmorillonite clay (intercalate) showed excellent thermal stability from TGA testing. The weight loss from 200-300° C. was less than 2.0 wt %.

Example 4

Preparation of Nanocomposite of Polyamide and Polyamide-Oligomer-Silicate via Polymerization Route Into a jacketed reaction vessel equipped with a stirring device, a partial condenser, a cooler, a dropping funnel, and a nitrogen inlet, 4.06 mols (593 g) of adipic acid and 25 g of the polyamide-oligomer-silicate (BAB-type) described in example-2 were introduced. After replacing the inner atmosphere with nitrogen, adipic acid was uniformly melted at 170° C. under a nitrogen stream. To the molten system of adipic acid and silicate, 4.06 mols (553 g) of m-xylylenediamine was continuously added dropwise under stirring. During the addition, the inner temperature was continuously raised to 245° C. The water distilled off with the addition of m-xylylenediamine was removed from the reaction vessel through the partial condenser and the cooler. After completing the addition of m-xylylenediamine, the inner temperature was raised to 255° C. and the reaction was continued for 15 minutes. Then the reaction vessel was vacuumed continuously to 600 torr for 10 minutes and the reaction was continued for 40 minutes. During the reaction, the inner temperature of the reaction vessel was continuously raised to 260° C. The resultant polyamide was cooled down and taken out of the reaction vessel in the form of a solid and ground. The ground polyamide was dried at 140° C. below 1 torr for 5 hours.

The obtained polyamide had a molecular weight of 16,000 and a melting point of 239° C.

The obtained polyamide was fed to a T-die single screw extruder with a 20 mm cylinder (Laboplastmill produced by TOYOSEIKI) and a non-oriented film was obtained. The obtained film did not include non-dispersed silicate and its oxygen transmission rate was 0.04 cc mm/m² day at atmospheric pressure.

Example 5

Preparation of nanocomposite of Polyamide and Polyamide-Oligomer-Silicate via Melt-Extrusion Route A polyamide oligomer (BAB-type) intercalated layered silicate (intercalate) described in Examples 2 and 3 was used to prepare a nanocomposite composition via a melt processing process in a nylon MXD6 matrix polymer. The processing was conducted in a Leistritz 27 mm twin screw extruder at a processing temperature of 275° C. and screw speed of 300 rpm. The layered silicate loading was in the range of 3-8wt %. Monolayer films were cast from the compounded pellets. Films were measured for oxygen transmission rate (OTR) on Mocon Oxtran 2/20 and observed under an optical microscope. The dispersibility of the intercalates and exfoliates in the nanocomposite composition was excellent. The OTR of the film with 5% by weight intercalate was 0.04 cc mm/m 2day. With increased intercalate loading of 7%, the OTR of the film was 0.02 cc mM/Mm²/day. Testing conditions were 65% RH at room temperature.

Example 6

Preparation of m-xylylene-Containing Polyamide (BABAB-Type) Oligomer

Into a jacketed reaction vessel equipped with a stirring device, a partial condenser, a cooler, a dropping funnel, and a nitrogen inlet, 6.80 mols (994 g) of adipic acid was introduced. After replacing the inner atmosphere with nitrogen, adipic acid was uniformly melted at 160° C. under a nitrogen stream. To the molten adipic acid, 10.20 mols (1389 g) of m-xylylenediamine was continuously added dropwise under stirring. During the addition, the inner temperature was continuously raised to 220° C. The water distilled off with the addition of m-xylylenediamine was removed from the reaction vessel through the partial condenser and the cooler. After completing the addition of m-xylylenediamine, the inner temperature was raised to 260° C. and the reaction was continued for 30 minutes. The resultant polyamide oligomer was cooled down and taken out of the reaction vessel in the form of a solid. The solid polyamide oligomer was ground. 1 kg of ground oligomer was added into 3 liters of distilled water and stirred. After stirring at 40° C. for 1 hour, the oligomer was separated from water through filtering and was dried at 100° C. below 1 torr for 10 hours.

Example 7

Preparation of Silicate Treatment with Polyamide Oligomer (BABAB) in Water Media Only 50 g of montmorillonite (PG-clay produced by Nanocor, Inc. capacity ion-exchange; 1.0 meq/g) was added into 2 liters of distilled water and stirred at 80° C. for 2 hours. On the other hand, 29 g of the polyamide oligomer (BABAB-type) obtained in example 6 was dissolved in 2 liters of distilled water at 80° C. for 1 hour under stirring. Then 25 cc of 2N hydrochloric acid was added to protonate an amine functionality of the polyamide oligomer. The solvent, including the ionized (amine-protonated) polyamide oligomer, and the montmorillonite, dispersed in water, were mixed and stirred at 80° C. for 1 hour and the ion-exchange treatment (intercalation) of the montmorillonite was performed. After this treatment, the settled montmorillonite was separated through filtering and was washed in 3 liters of distilled water. The obtained polyamide-oligomer-silicate was dried at 80° C. for 24 hours The modified montmorillonite clay showed excellent thermal stability from TGA testing. The weight loss from 200-300° C. was less than 2.0 wt %.

Example 8

Preparation of Nanocomposite of Polyamide Matrix Polymer and Polyamide-Oligomer-Silicate via Polymerization Route Into a jacketed reaction vessel equipped with a stirring device, a partial condenser, a cooler, a dropping funnel, and a nitrogen inlet, 4.06 mols (593 g) of adipic acid and 25 g of the polyamide-oligomer-silicate (BABAB-type) described in example-7 were introduced. After replacing the inner atmosphere with nitrogen, adipic acid was uniformly melted at 170° C. under a nitrogen stream. To the molten system of adipic acid and silicate, 4.06 mols (553 g) of m-xylylenediamine was continuously added dropwise under stirring. During the addition, the inner temperature was continuously raised to 245° C. The water distilled off with the addition of m-xylylenediamine was removed from the reaction vessel through the partial condenser and the cooler. After completing the addition of m-xylylenediamine, the inner temperature of the reaction vessel was raised to 255° C. and the reaction was continued for 15 minutes. Then the reaction vessel was vacuumed continuously to 600 torr for 10 minutes and the reaction was continued for 40 minutes. During the reaction, the inner temperature was continuously raised to 260° C. The resultant polyamide was cooled down and taken out of the reaction vessel in the form of a solid and ground. The ground polyamide was dried at 140° C. below 1 torr for 5 hours.

The obtained polyamide had a molecular weight of 16,000 and a melting point of 239° C.

The obtained polyamide was fed to a T-die single screw extruder with 20 mm cylinder (Laboplastmill produced by TOYOSEIKI) and a non-oriented film was obtained. The obtained film did not include non-dispersed silicate and its oxygen transmission rate was 0.04 cc mm/m$^2$ day at atmospheric pressure.

Example 9

Preparation of Nanocomposite of MXD6 Polyamide Matrix Polymer and Polyamide-Oligomer-Silicate Intercalate via Melt-Extrusion Route The polyamide oligomer (BABAB-type) intercalated layered silicate, described in example 7, was used to prepare a nanocomposite composition via melt processing in a nylon MXD6 matrix polymer. The processing was conducted in a Leistritz 27 mm twin screw extruder at a processing temperature of 275° C. and screw speed of 300 rpm. The layered silicate loading was in the range of 3-8wt %. Monolayer films were cast from the compounded pellets. Films were measured for OTR on Mocon Oxtran 2/20 and observed under an optical microscope. The dispersibility of the intercalates and exfoliates in the nanocomposite composition was excellent. The OTR of the film with 5% intercalate Was 0.04 cc mm/m$^2$/day. With increased intercalate loading of 7%, the OTR of the film was 0.02 cc mm/m$^2$day. Testing conditions were 65% RH at room temperature.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the process may be varied substantially without departing from the spirit of the invention, and the exclusive use of all modifications which come within the scope of the appended claims is reserved.

What is claimed:

1. An intercalate, capable of being exfoliated, formed by contacting a layered phyllosilicate material with an intercalant, without prior sorption of an onium ion spacing agent, wherein the intercalant is an oligomer or polymer surface modifier that is a protonated reaction product consisting of at least one diamine and at least one dicarboxylic acid, said reaction product having at least one amine group that is protonated for ion-exchange with an interlayer cation of the layered phyllosilicate material, to achieve ion-exchange of the protonated amine group of the intercalant surface modifier with the interlayer cation of the layered phyllosilicate material, between adjacent spaced layers of the layered phyllosilicate material, to expand the spacing between a predominance of the adjacent platelets of said layered material at least about 5 Å, when measured after sorption of intercalant surface modifier.

2. An intercalate in accordance with claim 1, wherein the intercalant contacts the layered phyllosilicate material to form an intercalating composition, and the concentration of intercalant surface modifier in said intercalating composition is at least about 0.1% by weight, based on the weight of water, organic solvent for the surface modifier, and intercalant surface modifier in the intercalating composition.

3. An intercalate in accordance with claim 2, wherein the intercalant is an oligomer and the concentration of the intercalant surface modifier in said intercalating composition is at least about 15% by weight, based on the dry weight of the phyllosilicate in the intercalating composition.

4. An intercalate in accordance with claim 3, wherein the concentration of the intercalant surface modifier in said intercalating composition is at least about 20% by weight, based on the dry weight of the phyllosilicate in the intercalating composition.

5. An intercalate in accordance with claim 4, wherein the concentration of the intercalant surface modifier in said intercalating composition is at least about 30% by weight based on the dry weight of the phyllosilicate in the intercalating composition.

6. An intercalate in accordance with claim 5, wherein the concentration of the intercalant surface modifier in said intercalating composition in the range of about 50% to about 80% by weight.

7. An intercalate in accordance with claim 3, wherein the concentration of the intercalant surface modifier in the intercalating composition is at least about 16% by weight.

8. An intercalate in accordance with claim 7, wherein the concentration of the intercalant surface modifier in the intercalating composition is in the range of about 16% to about 200% by weight.

9. An intercalate in accordance with claim 8, wherein the concentration of the intercalant surface modifier in the intercalating composition is in the range of about 16% to less than about 35% by weight.

10. An intercalate in accordance with claim 8, wherein the concentration of the intercalant surface modifier in the intercalating composition is in the range of about 35% to less than about 55% by weight.

11. An intercalate in accordance with claim 8, wherein the concentration of the intercalant surface modifier in the intercalating composition is in the range of about 55% to less than about 70% by weight.

12. A method of exfoliating a layered phyllosilicate material comprising:
    contacting the layered silicate material with an intercalating composition comprising at least about 2% by weight of an oligomeric intercalant surface modifier, without prior sorption of an onium or silane coupling agent, wherein the intercalant is a protonated reaction product consisting of at least one diamine and one dicarboxylic acid, said reaction product having at least one amine group that is protonated for ion-exchange with an interlayer cation of the layered phyllosilicate material, to intercalate the oligomeric intercalant surface modifier between adjacent silicate platelets of the layered phyllosilicate material to form an intercalate; and
    separating the platelets of the intercalate.

13. The method of claim 12, wherein the intercalate is exfoliated into a predominance of individual platelets.

14. A method in accordance with claim 12, wherein the amount of intercalant surface modifier intercalated into the phyllosilicate material is 10-200% intercalant surface modifier, based on the dry weight of the phyllosilicate material.

15. A method in accordance with claim 12, wherein the amount of intercalant surface modifier intercalated into the phyllosilicate material is about 15% to about 80%, based on the dry weight of the phyllosilicate material.

16. An intercalate, capable of being exfoliated, formed by contacting a layered phyllosilicate material with an intercalating composition including an intercalant oligomer or polymer surface modifier that is a protonated reaction product consisting of at least one diamine and at least one dicarboxylic acid, without an onium ion spacing agent, said protonated reaction product having at least one amine group that is protonated for ion-exchange with an interlayer cation of the layered phyllosilicate material, to form an oligomer intercalant surface modifier and to achieve ion-exchange of the protonated amine group of the oligomer intercalant surface modifier with the interlayer cation of the layered phyllosilicate material, between adjacent spaced layers of the layered phyllosilicate material, to expand the spacing between a predominance of the adjacent platelets of said layered phyllosilicate material at least about 5 Å, when measured after sorption of intercalant surface modifier.

17. An intercalate in accordance with claim 16, having formula 1 or 2 as follows, wherein "B" represents a xylylenediamine-component-containing Base, and "A" represents a dicarboxylic acid, wherein at least one of the B components includes a protonated amine functionality, and wherein n=1-20; and m=0-20:

B(AB)$_n$ 1

B(AB)$_m$A 2.

18. An intercalate in accordance with claim 17, wherein B is a xylylenediamine comprising at least 60 mole % m-xylylenediamine.

19. An intercalate in accordance with claim 18, wherein A is selected from adipic acid or succinic acid.

20. An intercalate in accordance with claim 16, wherein the intercalant has a structural formula I, II, III, IV, V, VI, or a combination of any two or more:

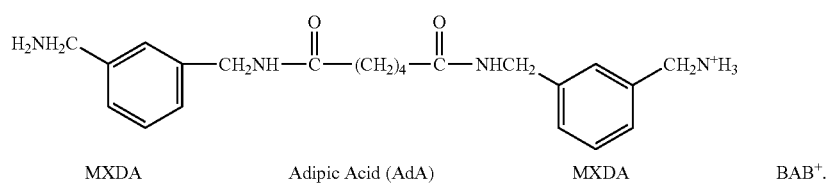

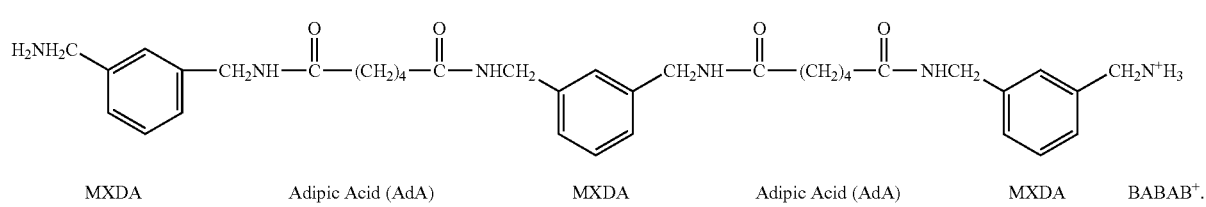

-continued $$H_3{}^+NH_2C-C_6H_4-CH_2NH-CO-(CH_2)_4-CO-NHCH_2-C_6H_4-CH_2N^+H_3 \quad \text{III}$$

MXDA     Adipic Acid (AdA)     MXDA     ⁺BAB⁺.

$$H_3{}^+NH_2C-C_6H_4-CH_2NH-CO-(CH_2)_4-CO-NHCH_2-C_6H_4-CH_2NH-CO-(CH_2)_4-CO-NHCH_2-C_6H_4-CH_2N^+H_3 \quad \text{IV}$$

MXDA    Adipic Acid (AdA)    MXDA    Adipic Acid (AdA)    MXDA    ⁺MAMAM⁺.
⁺BABAB⁺

$$H_3N^+H_2C-C_6H_4-CH_2NH-CO-(CH_2)_4-CO-OH \quad \text{V}$$

MXDA     Adipic Acid (AdA)     ⁺BA.

$$H_3N^+H_2C-C_6H_4-CH_2NH-CO-(CH_2)_4-CO-NHCH_2-C_6H_4-CH_2NH-CO-(CH_2)_4-CO-OH \quad \text{VI}$$

MXDA    Adipic Acid (AdA)    MXDA    Adipic Acid (AdA)    +BABA.

21. An intercalate, capable of being exfoliated, comprising a layered silicate material and a protonated intercalant surface modifier, the protonated intecalant surface modifier that is a protonated reaction product consisting of at least one diamine and at least one dicarboxylic acid, polymerized and amine-protonated while in contact with the layered silicate material, wherein the diamine comprises a xylylenediamine, wherein the protonated amine group of the intercalant surface modifier is ion-exchanged with an interlayer cation of the layered silicate material, between adjacent spaced layers of the layered silicate material, wherein the spacing between a predominance of the adjacent platelets of said layered material expanded at least about 10 Å, when measured after sorption of the protonated intercalant surface modifier, without prior sorption of an onium ion or silane coupling agent.

22. An intercalate in accordance with claim 21, wherein the concentration of the xylylenediamine component in the intercalant surface modifier is at least 50 mole %.

23. An intercalate in accordance with claim 22, wherein the concentration of the xylylenediamine component in the intercalant surface modifier is at least 70 mole %.

24. An intercalate in accordance with claim 21, wherein the xylylenediamine component in the intercalant surface modifier comprises at least 60 mole % m-xylylenediamine.

25. An intercalate in accordance with claim 24, wherein the xylylenediamine component in the intercalant surface modifier comprises at least 70 mole % m-xylylenediamine.

26. An intercalate in accordance with claim 25, wherein the xylylenediamine component in the intercalant surface modifier comprises at least 80 mole % m-xylylenediamine.

27. An intercalate in accordance with claim 26, wherein the xylylenediamine component in the intercalant surface modifier comprises at least 95 mole % m-xylylenediamine.

28. An intercalate in accordance with claim 24, wherein the xylylenediamine component in the intercalant surface modifier comprises up to about 40 mole % p-xylylenediamine.

29. An intercalate in accordance with claim 28, wherein the dicarboxylic acid component in the intercalant surface modifier is selected from the group consisting of adipic acid, sebacic acid, suberic acid, undecanoic acid, dodecanedioic acid, eicosanedioic acid, terephthalic acid, isophthalic acid, and combinations thereof.

30. An intercalate in accordance with claim 21, wherein the dicarboxylic acid component in the intercalant surface modifier comprises at least 50 mole % alpha, omega-straight chain aliphatic dicarboxylic acid.

31. An intercalate in accordance with claim 30, wherein the dicarboxylic acid component in the intercalant surface modifier comprises at least 60 mole % alpha, omega-straight chain aliphatic dicarboxylic acid.

32. An intercalate in accordance with claim 31, wherein the dicarboxylic acid component in the intercalant surface modifier comprises at least 70 mole % alpha, omega-straight chain aliphatic dicarboxylic acid.

33. An intercalate in accordance with claim 30, wherein the alpha, omega-straight chain aliphatic dicarboxylic acid component in the intercalant surface modifier has 6 to 24 carbon atoms.

34. An intercalate in accordance with claim 33, wherein the dicarboxylic acid component in the intercalant surface modifier comprises at least 80 mole % alpha, omega-straight chain aliphatic dicarboxylic acid.

35. A method of exfoliating layered silicate material in accordance with claim 12, wherein the intercalate is selected from the group consisting of formulas I, II, III, IV, V, VI and a combination of any two or more:

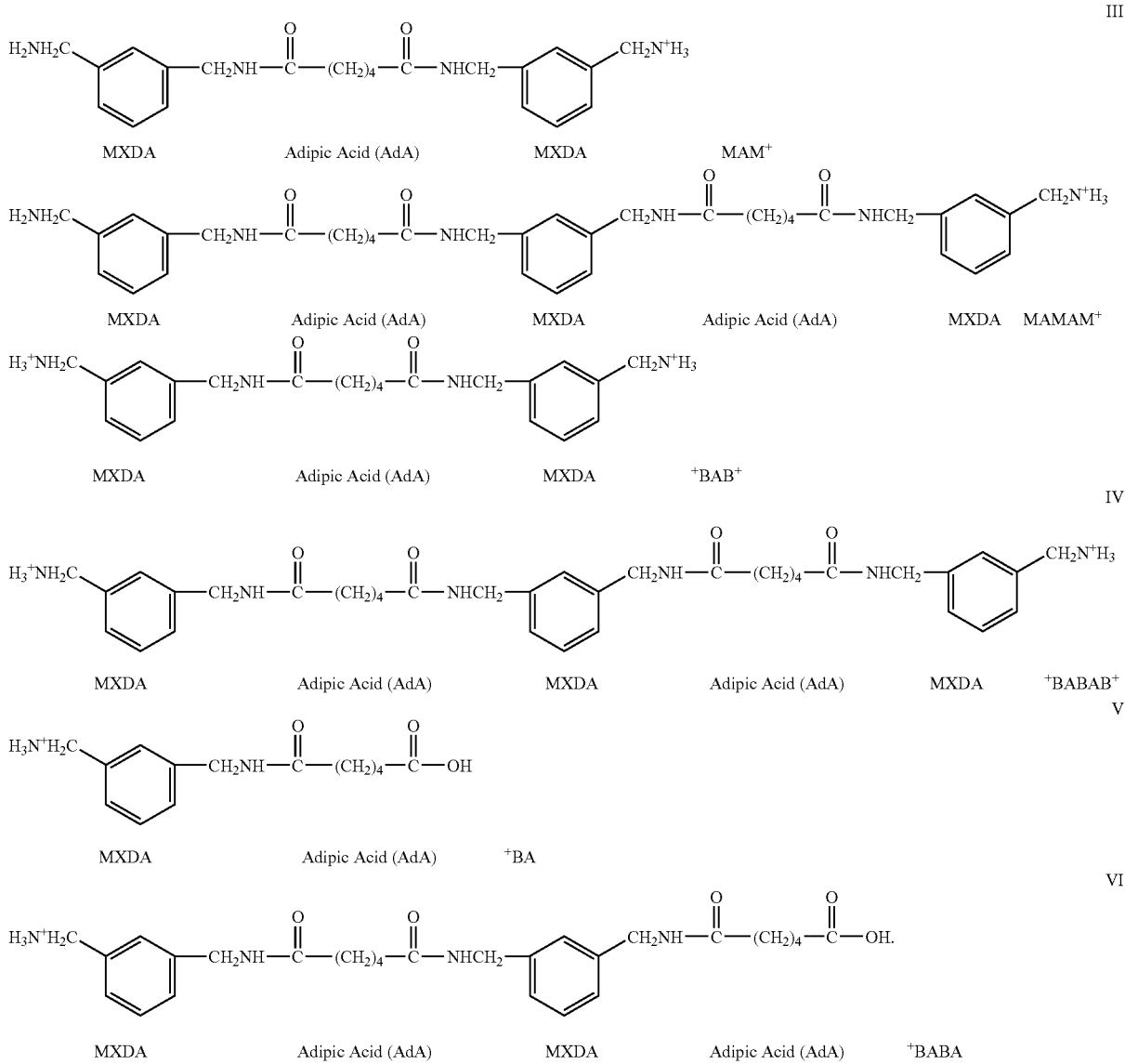

* * * * *